UNITED STATES PATENT OFFICE.

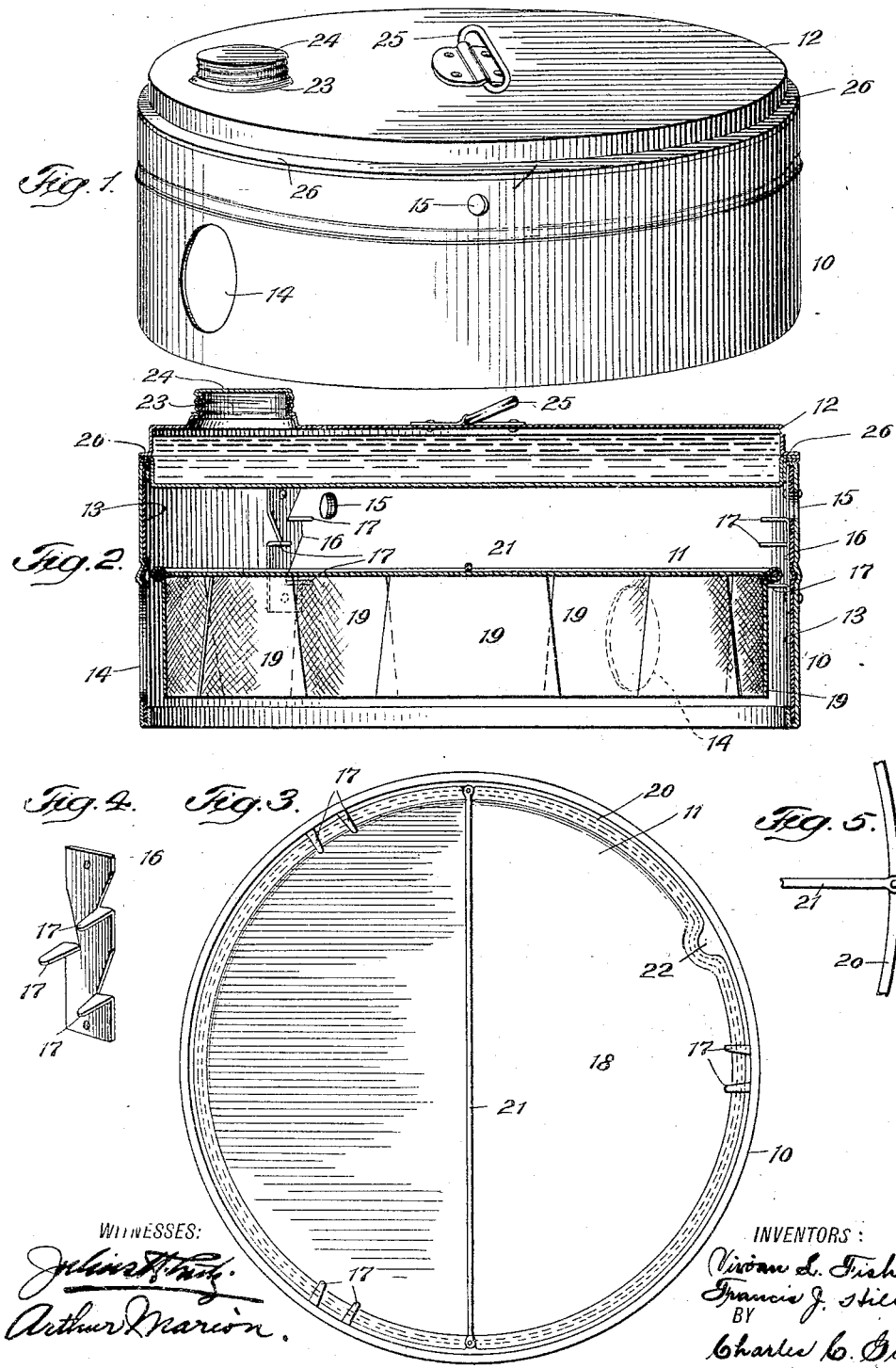

VIVIAN L. FISHER, OF NEWARK, NEW JERSEY, AND FRANCIS J. HILL, OF NEW YORK, N. Y., ASSIGNORS TO WALTER DURBROW, OF WEST NEW BRIGHTON, NEW YORK.

CHICKEN-BROODER.

1,196,095. Specification of Letters Patent. Patented Aug. 29, 1916.

Application filed March 18, 1915. Serial No. 15,230.

*To all whom it may concern:*

Be it known that we, VIVIAN L. FISHER, a subject of the King of Great Britain, and a resident of Newark, in the county of Essex and State of New Jersey, and FRANCIS J. HILL, a citizen of the United States, and a resident of New York city, in the county and State of New York, have invented certain new and useful Improvements in Chicken-Brooders, of which the following is a specification.

Our invention pertains more particularly to brooders for small chicks, and its object is, generally speaking, to provide a brooder of great efficiency and one capable of use without danger of injury to the chicks as by over-heating or smothering or otherwise.

The brooder of our invention dispenses entirely with the use of lamps or fire of any kind and may be termed a "heated fireless brooder," the heat being derived from hot water placed at night within a tank which constitutes the top of the brooder and is separated from the chicks by the material, in our case preferably felt, of which the "mother" is formed. Hot water poured into the tank will keep the chicks comfortable until the morning, and then if weather conditions should require the water may be poured from the tank and replaced with another supply of hot water.

The brooder of our invention comprises, in the preferred form, a cylindrical body portion of suitable height having ingress and egress apertures in its sides for the chicks and ventilating apertures and lined with tar paper or the like, a "mother" adjustably mounted within said body portion and comprising a top closely fitting the inner walls of said portion and having hanging sections extending downwardly from the outer edges thereof, and a removable tank partly fitting within and serving as a top for said body portion, said tank constituting a reasonably shallow receptacle having a filling nozzle and handle on its upper side and a peripheral flange by which the tank may be supported upon the upper edges of the body portion of the receptacle, said tank being above the top of the "mother."

The invention will be fully understood from the detailed description hereinafter presented, reference being had to the accompanying drawings, in which:

Figure 1 is a perspective view of a brooder constructed in accordance with and embodying the invention; Fig. 2 is a central vertical transverse section through the same; Fig. 3 is a top view of the same with the covering tank removed; Fig. 4 is a detached perspective view of one of the brackets secured to the inner wall of the body of the brooder and utilized for supporting the "mother" in vertically adjusted position, and Fig. 5 is a detached top view of a small portion of the frame by which the top of the brooder is held distended, said frame having an exposed transverse rod or bar serving as a handle for the "mother" besides operating to stiffen the general frame of the "mother."

In the drawings 10 designates the body portion of the brooder, 11 the "mother," and 12 the hot water tank or receptacle detachably applied upon the upper edges of said body portion 10 and serving as the top or cover for the brooder. The body portion 10 is preferably of cylindrical outline and formed of galvanized iron, and said body portion 10 has a vermin-proof lining 13 and in its sides is formed with ingress and egress openings 14 for the chicks and, above the "mother" 11, with small openings 15 for ventilating purposes. To the inner walls of the body portion 10 are securely riveted vertical galvanized iron bars 16 each having staggered bracket arms 17 cut from the edges thereof and bent inwardly into horizontal position.

The "mother" 11 will preferably be formed of felt, since felt is free from the threads which unravel from flannel and frequently injure the chicks, and said "mother" has a flat top 18 closely fitting within the vertical walls of the body portion 10 and independent sections 19 hanging downwardly from the outer edges of said top 18 and lapping over the whole or a portion of the ingress and egress openings 14 in accordance with the desired conditions.

Within the edges of the top 18 is secured a wire frame 20 which serves to keep the top 18 distended and the sections 19 of the "mother" in proper relation to the inner walls of the body portion 10. The wire frame 20 serves as a stiffener and provides suitable means by which the "mother" may be suspended on the supporting bracket arms 17. The frame 20 is of ring form and we secure thereto the cross-rod 21 which is above the top 18 of the "mother" and serves as a handle and as convenient means for facilitating the adjustment of the vertical height of the "mother" in accordance with the growth of the chicks.

We illustrate the "mother" 11 as resting at its upper edges on the lowermost bracket arms 17, and in placing the "mother" in this position we first, by holding the "mother" in a tilted position, insert the upper edge thereof upon said bracket arms 17 of two adjacent bars 16 and then lower the higher edge of the "mother" whereat is the notch 22 formed by a bend in the wire frame 20, downwardly with the notch 22 escaping the bracket arms 17 of the third bar 16 until such edge of the "mother" reaches the lower bracket arm 17 of said third bar 16, and after that we take hold of the cross-rod 21 and by giving the "mother" a slight rotary movement carry the notch 22 from line with the lower bracket arm 17 of said third bar 16 or to the position shown in Fig. 3, the "mother" then being securely held upon the lower bracket arms 17 and prevented from being pushed upwardly by the bracket arms 17 immediately above it. The notch 22 is provided solely for the purpose of enabling the "mother" to be inserted on the lower bracket arms 17 of two of the bars 16 and then lowered at its free edge with the notch 22 passing downwardly and escaping the bracket arms 17 of the third bar 16. It is necessary to give the "mother" a slight rotary movement after it has reached the lower bracket arm 17 of the third bar 16, otherwise the "mother" might tilt downwardly at the side having the notch 22. When it is desired to raise or lift the "mother," as the chicks grow larger, the "mother" will be given a slight rotary motion reversely to its former rotation to carry the notch 22 in line with the adjacent bar 16, and thereupon the "mother" will be tilted upwardly to carry its opposite edges from the lower bracket arms 17. The "mother" may be then returned to the body portion 16 and placed upon the middle bracket arms 17 in accordance with the same method followed in placing the same on the lower bracket arms 17. Later on as the chicks become larger the "mother" may be placed upon the upper bracket arms 17, thus increasing the capacity of the interior of the brooder. The ventilation apertures 15 are above the top of the "mother" 11, thereby forming an air chamber between the tank 12 and "mother" 11.

The tank 12 is circular in outline and formed of galvanized iron and has in its top a nozzle 23 through which hot water may be supplied to the tank or the tank emptied. The nozzle 23 is equipped with a convenient screw-thread cap 24 of known character. The top of the tank 12 should also be provided with a handle 25 for convenience in carrying it. The tank 12 comprises two substantially corresponding sections secured together at their adjoining edges and thereat forming an annular flange 26. The tank fits closely within the upper edges of the body portion 10 and is supported in position by the engagement of said flange 26 with the extreme upper edges of the body portion 10. The tank forms a reasonably shallow receptacle extending over the entire top of the brooder, as shown in Fig. 2, and said tank when in position serves as the top of the brooder. The chicks will travel in and out of the brooder at will and when in the brooder will be protected from cold and the like by the "mother" 11. At night and on cold days the chicks will require further warmth, and to meet this demand hot water will be filled within the tank 12. The hot water will impart a proper character and degree of heat to the interior of the brooder and this heat coupled with the protection afforded by the heater 11 will keep the chicks comfortable. We regard the use of hot water for heating the brooder as very beneficial as distinguished from the use of lamps and other heat producing devices because of the character of the heat, its uniformity over the entire top of the brooder and the absence of anything which might tend to injure the chicks either by over-heating or smothering. The brooder of our invention is fireless, and this in itself is of great benefit.

The brooder as a whole has been constructed to secure efficiency with that degree of simplicity enabling the convenient manufacture and use of the same.

The brooder may be manufactured at comparatively small expense, and hence may be sold at a reasonably small price. By forming the tank 12 of two substantially corresponding sections said tank may have its upper section turned downwardly into the body portion 10 when it is desired to ship the brooder, the nozzle 23, cap 24 and handle 25 then being within the body portion 10 and the tank leaving a smooth surface to engage the box in which the brooder may be shipped.

What we claim as our invention and desire to secure by Letters Patent, is:

1. A brooder for chicks and the like comprising a body portion having a door opening in the side thereof, a "mother" within said body portion, and a removable tank forming the top of the brooder and adapted to receive hot water, said tank being composed of upper and lower substantially similar sections flanged outwardly and secured together at their adjoining edges and thereat forming a peripheral flange to engage the upper edges of said body-portion.

2. A brooder for chicks and the like comprising a body portion having a door opening in the side thereof, a "mother" within said body portion, and a removable tank forming the top of the brooder and adapted to receive hot water, said tank having a peripheral flange to engage the upper edges of said body portion and being adapted below said flange to set within said body portion, and said tank having a filling nozzle and a handle on its top and also being reversible in the upper portion of said body-portion.

3. A brooder for chicks and the like comprising a body-portion having openings for the ingress and egress of the chicks, heating means, a "mother" and means for the vertical adjustment of the "mother," said "mother" having a top, an encompassing ring holding said top distended, dependent curtain sections and a rod extending across said top and secured at its ends to said ring, and said means of adjustment comprising a plurality of bars secured to the inner walls of said body-portion and having a plurality of inwardly extending bracket-arms at varying heights adapted to support said "mother" at said ring, said ring being recessed inwardly to pass one set of the bracket-arms and thereby facilitate the application of the "mother" to position.

VIVIAN L. FISHER.
FRANCIS J. HILL.

Witnesses as to Vivian L. Fisher:
H. J. VAN DUYNE,
A. F. DURBROW.
Witnesses as to Francis J. Hill:
OTTO HESSLER,
A. F. DURBROW.

Copies of this patent may be obtained for five cents each, by addressing the "Commissioner of Patents, Washington, D. C."